Sept. 25, 1923.
W. G. ENGLE
1,468,779
LUGGAGE CARRIER AND REAR BUMPER
Filed Aug. 14, 1922
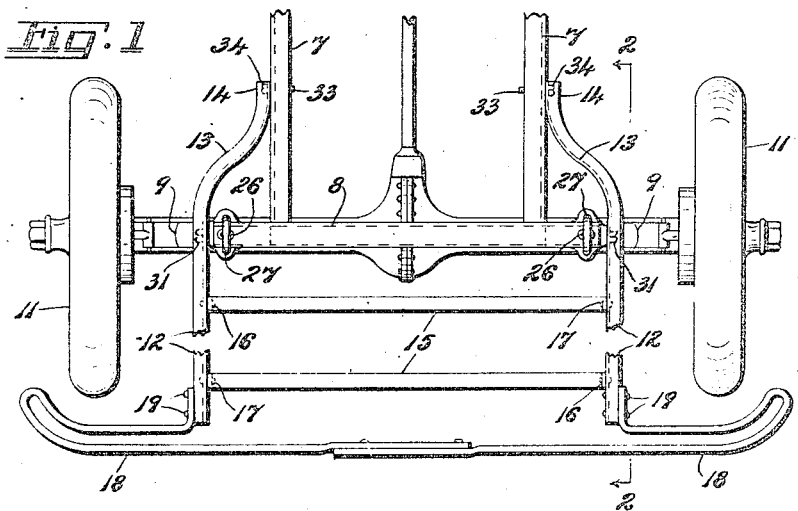
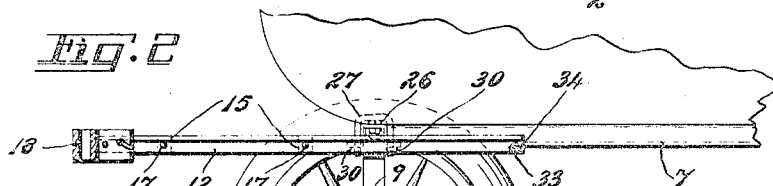
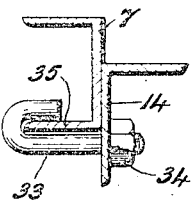
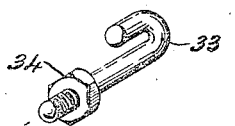
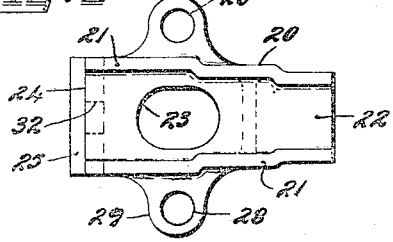
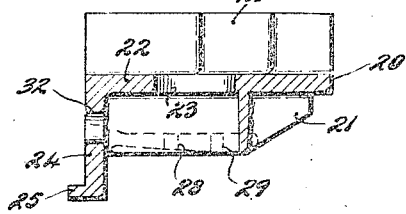
Warren G. Engle
INVENTOR.
BY Alfred T. Bratton
ATTORNEY.

Patented Sept. 25, 1923.

1,468,779

UNITED STATES PATENT OFFICE.

WARREN G. ENGLE, OF PHILADELPHIA, PENNSYLVANIA.

LUGGAGE CARRIER AND REAR BUMPER.

Application filed August 14, 1922. Serial No. 581,856.

*To all whom it may concern:*

Be it known that I, WARREN G. ENGLE, a citizen of the United States, residing at Philadelphia, in the county of Philadelphia and State of Pennsylvania, have invented a new and useful Luggage Carrier and Rear Bumper, of which the following is a specification.

This invention relates to attachments for motor vehicles and it has more particular reference to devices of a character for easy connection to the chassis or underframe of Ford automobiles for the purpose of carrying tires, luggage and the like.

The primary object of my invention is to provide a combination luggage carrier and rear bumper which is of a character that lends itself to easy connection to the rear cross bar of an automobile chassis or underframe.

Another object of this invention is to provide a device of the foregoing referred to character which will serve as a support for trunks or luggage while also operating as a bumper or rear fender for motor vehicles.

A further object of my invention is to provide a combination luggage carrier and rear bumper which can be readily secured to the rear cross bar of an automobile chassis without dismantling or raising the vehicle body from said chassis.

A still further object of this invention is to provide a device of the foregoing referred to character which is economical to manufacture, durable and positive in action, and easily connectible to the chassis of a Ford car.

With the foregoing and other objects in view as will be more clearly apparent from the following description, my invention consists of the novel features of construction, the parts and combinations thereof, and the mode of operation or their equivalents, as hereinafter specifically described and set forth in the appended claims.

In the further disclosure of the invention reference is to be had to the accompanying sheet of drawings constituting a part of this specification, and in which like characters of reference designate the same or corresponding parts in all the views.

Figure 1 is a top plan view illustrative of my novel attachment or combined luggage carrier and rear bumper as applied to the rear end of a Ford chassis, parts being broken away for a reason later on explained.

Figure 2 is a sectional end elevation of the same taken substantially on the line 2—2 in Figure 1.

Figure 3 is an enlarged fragmentary detail illustrating the manner of clamping my attachment to the side members of an automobile chassis.

Figure 4 is a perspective detail of a clamping bolt hereinafter more particularly described.

Figure 5 is an enlarged plan view of a supporting member hereinafter more fully explained; and, Figure 6 is a longitudinal section through the same.

Referring more particularly to the drawings a fragmentary portion of the chassis or underframe of a Ford automobile is designated by the numeral 7 while the rear cross bar thereof is designated by the numeral 8. The rear transverse spring suspension is indicated by the numeral 9, while 10 and 11 designate the rear axle and drive wheels respectively, all of said parts being in conformity with well known constructions and forming no part of this invention.

The combined luggage carrier and rear bumper constituting the subject matter of this invention comprises opposed rearwardly directed side members 12 preferably—though not essentially—formed from angle bars of suitable size, and said side members 12 have their inner or forward portions bowed or bent at 13 to provide short end parts 14 in parallel alignment with the major portion of the aforesaid members 12. These end parts 14 are spaced apart to snugly abut the side or longitudinal members of the aforesaid chassis or underframe 7, and the side members 12 are appropriately braced in rigid spaced and parallel relation by tie bars 15 conveniently formed from flat bars having their ends downwardly angled at 16 and secured to vertically disposed flanges of the side members 12 by rivets or stove bolts 17. Or, as will be readily understood by those acquainted with the art to which this invention appertains, angle bars may be employed instead of the flat tie bars 15. Still further it is to be noted the tie bars 15 may be secured as aforesaid on the top or horizontally disposed flanges of the side members 12.

Connected to the extreme outer or rear ends of the side members 12 is a bumper bar or rear fender 18 of any of the well known types, and it is conveniently secured in place to the vertical flanges of the said members 12 by rivets or stove bolts 19. Obviously the number of tie bars 15 will depend upon the size of the luggage carrier as well as their spaced relation relative to each other.

In order to provide a simple and easily connectible means for rigidly supporting my novel combination luggage carrier and rear bumper in place, I employ the device shown to an enlarged scale in Figures 5 and 6. This device or support consists of a somewhat elongated casting 20 of appropriate metal having vertically spaced walls 21 which are slightly tapered or inwardly stepped as shown for easy but snug projection upwards between the depending flanges of the rear cross bars 8 of the vehicle chassis 7, and near the outer ends thereof. Said elongated casting 20 also embraces a lateral portion or web 22 intermediate its upper and lower edges, which is provided with an elongated slot or aperture 23 therethrough. Still further it is to be observed that each elongated casting 20 is formed at its wider end with a depending wall 24 having a horizontal shoulder or outset rib 25 at its lowermost portion. The elongated casting 20 is secured in place by forcing the same upwardly between the flanges of the rear cross bar 8 with the head of the body bolt 26 in the aforesaid slot or aperture 23, as will be clearly understood by those conversant with the art to which my invention relates, it being obvious that the elongated slot or aperture 23 provides for correct lateral adjustments. In order to securely clamp the elongated castings 20 to the rear cross bar 8 as well as furnishing a means for adequately supporting any weight deposited on the luggage carrier, I employ inverted U-shaped or stirrup bolts 27 which are adapted to seat on the top face of the rear cross bar 8 with their leg portions passing through holes 28 in transverse lugs 29 integral with the outer faces of the elongated casting walls 21. The free ends of the leg portions are suitably screw threaded to receive lock nuts 30.

In assembling my novel combination luggage carrier and rear bumper, after the aforesaid elongated castings 20 have been secured in place as just described, the side members 12 are attached to the depending walls 24 by passing stove bolts 31 or the like through holes in the vertical flanges of said side members and registering holes 32 in the depending walls 24; it being obvious that the lower edges of said vertical flanges seat on the shoulders or outset ribs 25. Finally hook ended bolts 33 passing through holes provided for the purpose in the forward end parts 14 are clamped by lock nuts 34 to the lower laterally disposed flanges 35—Figure 3—of the side members of the chassis 7.

From the foregoing description, taken in connection with the accompanying sheet of explanatory drawings, the advantages of the construction and the method of attaching my novel combination luggage carrier and rear bumper will be readily apparent to those skilled in the art to which my invention appertains, and while I have specifically outlined a preferred embodiment and application thereof, it is to be understood that said invention is not limited to the precise details shown; therefore, the right is hereby reserved to make such changes as fairly lie within the scope of the appended claims.

Having thus described my invention what I claim as new and desire to secure by Letters Patent, is:—

1. The combination with a vehicle chassis and the rear cross member thereof, of an attachment comprising a pair of opposed rearwardly directed angle bars having inwardly curved forward ends adapted to abut the chassis side members, transverse tie slats rigidly bracing said side angle bars in parallel spaced relation, a bumper bar secured to the rear ends of the side angle bars, opposed elongated castings each having spaced walls adapted to fit upwardly into the aforesaid rear cross member, a horizontal web portion and a depending wall provided with an outset shoulder, means for adjustably connecting said elongated castings in the outer ends of the chassis rear cross member, clamping means for securely retaining said elongated castings in adjusted position, and means for clamping the inwardly curved forward ends of the angle side bars to the lower lateral flanges of the chassis side members.

2. The combination with a vehicle chassis and the rear cross member thereof, of an attachment comprising a pair of opposed rearwardly directed angle bars having inwardly curved forward ends adapted to abut the chassis side members, transverse tie slats rigidly bracing said side angle bars in parallel spaced relation, a bumper bar secured to the rear ends of the side angle bars, opposed elongated castings each having spaced walls adapted to fit upwardly into the aforesaid rear cross member, a horizontal web portion and a depending wall provided with an outset shoulder, means for adjustably connecting said elongated castings in the outer ends of the chassis rear cross member, inverted U-shaped bolts embracing the chassis rear member and the legs thereof passing through lugs on the elongated castings for securely clamping said castings in adjusted position, and means for clamping the inwardly curved forward ends of the angle side bars to the lower lateral flanges of the chassis side members.

3. The combination with a vehicle chassis and the rear cross member thereof, of an attachment comprising a pair of opposed rearwardly directed angle bars having inwardly curved forward ends adapted to abut the chassis side members, transverse tie slats rigidly bracing said side angle bars in parallel spaced relation, a bumper bar secured to the rear ends of the side angle bars, opposed elongated castings each having spaced walls adapted to fit upwardly into the aforesaid rear cross member, a horizontal web portion and a depending wall provided with an outset shoulder, means for adjustably connecting said elongated castings in the outer ends of the chassis rear cross member, inverted U-shaped bolts embracing the chassis rear member and the legs thereof passing through lugs on the elongated castings for securely clamping said castings in adjusted position, and hook headed bolts for clamping the inwardly curved forward ends of the angle side bars to the lower lateral flanges of the chassis side members.

4. As a new article of manufacture a supporting member for a combination luggage carrier and rear end bumper of the kind hereinbefore described, said supporting member having spaced vertical walls, an intermediate slotted web, a depending wall provided with an outset rib, and lateral opposed apertured lugs.

Signed at Philadelphia, Pa., the 11th day of August, 1922.

WARREN G. ENGLE.